(12) United States Patent
Sugitatsu et al.

(10) Patent No.: US 7,181,120 B2
(45) Date of Patent: Feb. 20, 2007

(54) OPTICAL ACTIVE DEVICE

(75) Inventors: Atsushi Sugitatsu, Tokyo (JP); Susumu Noda, Kyoto (JP)

(73) Assignees: Mitsubishi Denki Kabushiki Kaisha, Tokyo (JP); Kyoto University, Kyoto (JP)

( * ) Notice: Subject to any disclaimer, the term of this patent is extended or adjusted under 35 U.S.C. 154(b) by 0 days.

(21) Appl. No.: 10/379,556

(22) Filed: Mar. 6, 2003

(65) Prior Publication Data

US 2004/0062505 A1    Apr. 1, 2004

(30) Foreign Application Priority Data

Sep. 26, 2002    (JP)    ............... 2002-280754

(51) Int. Cl.
 *G02B 6/10*    (2006.01)
(52) U.S. Cl. ............... 385/131; 385/125; 385/129; 385/130; 385/132
(58) Field of Classification Search ........ 385/129–132, 385/16, 125
See application file for complete search history.

(56) References Cited

U.S. PATENT DOCUMENTS

| | | | | |
|---|---|---|---|---|
| 5,999,308 | A * | 12/1999 | Nelson et al. | 359/321 |
| 6,674,949 | B2 * | 1/2004 | Allan et al. | 385/129 |
| 6,697,542 | B2 * | 2/2004 | Platzman et al. | 385/5 |
| 6,738,551 | B2 * | 5/2004 | Noda et al. | 385/130 |
| 6,757,463 | B2 * | 6/2004 | Hutchinson et al. | 385/37 |
| 2002/0009277 | A1 | 1/2002 | Noda et al. | 385/131 |
| 2002/0048422 | A1 * | 4/2002 | Cotteverte et al. | 385/4 |
| 2002/0146196 | A1 * | 10/2002 | Shirane et al. | 385/16 |
| 2003/0142902 | A1 | 7/2003 | Sugitatsu | |
| 2004/0027646 | A1 * | 2/2004 | Miller et al. | 359/322 |
| 2004/0081388 | A1 * | 4/2004 | Koyama | 385/16 |

FOREIGN PATENT DOCUMENTS

| | | |
|---|---|---|
| EP | 1 010 997 | 6/2000 |
| JP | 9-64458 | 3/1997 |
| JP | 10-335758 | 12/1998 |
| JP | 11-330619 | 11/1999 |
| JP | 2000-232258 | 8/2000 |
| JP | 2001-272555 | 10/2001 |

OTHER PUBLICATIONS

Painter, O. et al.; "Defect modes of a two-dimensional photonic crystal in an optically thin dielectric slab", *J. Optical Society of America B*, vol. 16, No. 2, pp. 275-285, (Feb. 1999).
Imada, M. et al.; "Semiconductor Lasers with One- and Two-Dimensional Air/Semiconductor Gratings Embedded by Wafer Fusion Technique", *IEEE J. of Selected Topics in Quantum Electronics*, vol. 5, No. 3, pp. 658-663, (May/Jun. 1999).
"Current Status of Photonic Crystal Light Emitting Devices", *J. of Optronics*, No. 7, The Optronics Co., Ltd. (2001).
Chutinan, A.. et al.; "Surface-emitting channel drop filter using single defects in two-dimensional photonic crystal slabs", *Applied Physics Letters*, vol. 79, No. 17, pp. 2690-2692, (Oct. 22, 2001).
"Extended Abstracts (The 49th Spring Meeting, 2002)", *The Japan Society of Applied Physics and Related Societies*, No. 3, (Mar. 27, 2002).
Ryu, H. et al.; "Enhancement of Light Extraction From Two-Dimensional Photonic Crystal Slab Structures", *IEEE J. on Selected Topics in Quantum Electronics*, vol. 8, No. 2, pp. 231-237, (Mar./Apr. 2002).

* cited by examiner

*Primary Examiner*—Frank G. Font
*Assistant Examiner*—Eric Wong
(74) *Attorney, Agent, or Firm*—Leydig, Voit & Mayer, Ltd.

(57) ABSTRACT

In an optical device, a slab layer has an active layer sandwiched between two cladding layers. Periodic air holes are present in the slab layer. A linear defect region is present in a part of the air hole structures. As a result, laser oscillation is generated at the band end in a two-dimensional photonic crystal waveguide mode.

20 Claims, 12 Drawing Sheets

OPTICAL ACTIVE DEVICE

BACKGROUND OF THE INVENTION

1) Field of the Invention

The present invention relates to an optical active device using a two-dimensional slab photonic crystal, in which an optical control function is improved, in an optical device used for optical transmission and optical information processing.

2) Description of the Related Art

A photonic crystal is an optical material having a periodic refractive index distribution, and has a band structure, with respect to an optical energy, that is the same as for a solid crystal, including a band structure, with respect to an electronic energy due to a periodic potential distribution. A photonic crystal is obtained by, for example, periodically arranging materials having different refractive indexes multidimensionally. Such a photonic crystal reveals new optical properties such as dispersibility and anisotropy that cannot be obtained by conventional optical materials, and hence has been noted as a next generation element in optical communication and optical information processing.

As an optical device using such a photonic crystal, there is a two-dimensional slab photonic crystal optical device. When this two-dimensional slab photonic crystal optical device has a sheet form, it operates as a photonic crystal optical device showing optical properties based on the photonic band theory, by realizing confinement of light like a thin material layer sandwiched between upper and lower air layers, in a direction perpendicular to the sheet face, and forming a two-dimensional periodic structure in a direction parallel with the sheet face. This conventionally proposed two-dimensional slab photonic crystal optical device has a linearly defective waveguide in the two-dimensional photonic crystalline structure described above, and a point (isolated) defect is added near this linearly defective waveguide. By having such a configuration, an optical waveguide device can be obtained, which has an ADD/DROP filtering function capable of adding to or taking from beams having a specific wavelength relative the linearly defective waveguide (for example, see document 1).

Such a conventional two-dimensional slab photonic crystal optical device, however, comprises a uniform material or an inactive material, and does not have an active layer as an active constituent, and hence it only functions as a passive device. Therefore, various two-dimensional slab photonic crystal optical devices having an active layer as an active constituent have been proposed (for example, see documents 5 and 6).

In the document 5 is disclosed an optical device having a slab optical waveguide on the surface of a substrate, and also having photonic crystals formed by regularly arranging in a lattice form a refractive index changing region, having a refractive index different from that of a core layer of the slab optical waveguide, in a part of the slab optical waveguide, which has a photonic crystal waveguide portion comprising, a single or annular optical active region formed in a depletion region surrounded by photonic crystals where a refractive index changing region is not provided, an optical waveguide region connected to the optical active region and formed so as to cross the photonic crystals, and an excitation unit with which the optical active region is excited. In this optical device, stimulated emission is caused by using Bragg diffraction of light generated in the active layer by a refractive index periodic structure, to thereby generate laser oscillation.

The document 6 discloses a two-dimensional semiconductor optical crystal element, in which a dielectric layer having a low refractive index is plane-contacted with at least one surface of the semiconductor optical crystals having a two-dimensional periodic structure that has a periodically vertical hole structure.

Various photonic crystal lasers are proposed as the optical active device that has an active layer as an active constituent, and uses a defect mode based on a two-dimensional photonic band structure (for example, see documents 2 to 4, and document 7). In the document 2 is disclosed a photonic crystal laser constructed by fusing a wafer formed by sequentially laminating a normal n-type cladding layer, an active layer and a p-type cladding layer, on a wafer in which an n-type cladding layer having a triangular lattice-form two-dimensional periodic structure is formed on an n-type substrate. The n-type cladding layer having the two-dimensional periodic structure forms a refractive index periodic structure by uniformly forming a periodic structure using air holes on a two-dimensional plane, and is such that defects are not introduced in this periodic structure. The principle of oscillation by the photonic crystal laser is such that oscillation occurs in a portion where the group velocity of the photonic band structure becomes 0, that is, at a band end in the photonic crystal mode (hereinafter "photonic crystal slab mode due to two dimensions").

In the document 3 is disclosed a photonic crystal laser using the whole refractive index periodic structure on a two-dimensional plane is used as a laser oscillator, in photonic crystals having a structure in which an active region and a two-dimensional refractive index periodic structure are overlapped on each other, in order to strengthen the photonic crystal effect. A photonic crystal laser having a similar structure to that in this document 3 is disclosed in the document 5. The document 7 discloses a semiconductor laser comprising an active layer comprising a semiconductor and having optical amplification, and a phase shift section in which the luminous energy is coupled to only an optical mode in a predetermined direction, in a photonic crystal having a refractive index periodic structure on the order of the wavelength of light, as a semiconductor laser that can reduce a loss of injected energy and can obtain a high optical output by small electric power. Further, the document 4 discloses a photonic crystal laser in which a point defect is introduced in one point in a two-dimensional refractive index periodic structure to thereby use this point-defect region as a resonator.

Document 1: A. Chutinan, M. Mochizuki, M. Imada, and S. Noda, "Surface-emitting channel drop filters using single defects in two-dimensional photonic crystal slabs", "Applied Physics Letter", 2001, 79, 2690–2692.

Document 2: Masahiro Imada, Susumu Noda, Alongkarn Chutinan, Michio Murata, and Goro Sasaki, "Semiconductor Lasers with One- and Two-Dimensional Air/Semiconductor Gratings Embedded by Wafer Fusion Techinique, "IEEE JOURNAL OF SELECTED TOPICS IN QUANTUM ELECTRONICS", VLO. 5, No. 3, MYA/JUNE 1999, p. 658–663.

Document 3: Han-Youl Ryu, Jeong-Ki Hwang, Young-Jae Lee, and Yong-Hee Lee, "Enhancement of Light Extraction From Two-Dimensional Photonic Crystal Slab Structures", "IEEE JOURNAL OF SELECTED TOPICS IN QUANTUM ELECTRONICS", VLO. 8, NO. 2, MARCH/APRIL 2002, p. 231–237.

Document 4: O. Painter, J. Vuckovic, and A. Scherer, "Defect modes of a two-dimensional photonic crystal in an optically thin dielectric slab", "Journal of Optical Society of America B", Vol. 16, No. 2/February 1999, p, 275–285.

Document 5: Japanese Patent Application Laid-Open No. 11-330619 (p. 2, p. 6, FIGS. 1 to 3).

Document 6: Japanese Patent Application Laid-Open No. 2000-232258 (p. 2 to 4).

Document 7: Japanese Patent Application Laid-Open No. 9-64458 (p. 2, FIG. 1).

Normally, in the photonic crystal laser, the mode is determined by the refractive index periodic structure. However, in the photonic crystal laser shown in the document 2, there is a problem in that there is no control unit that oscillates the laser beam in a desired mode, because freedom in controlling the mode is small, and the band structure and the band ends are dense, thereby a specific mode selection between respective modes is difficult. Further, the photonic crystal effect is obtained by having a structure in which the active layer and the cladding layer having a two-dimensional refractive index periodic structure using air holes are separated vertically with respect to the layered plane, and using leakage of optical electric field from the active layer. In such a structure, however, there is a problem in that the photonic crystal effect becomes weak on the theory.

In the photonic crystal laser shown in the document 3, a laser resonator is constituted by the whole refractive index periodic structure uniformly formed in a two-dimensional plane, and a waveguide is not provided. Therefore, the light propagating in this resonator frequently crosses each boundary surface (in this case, air boundary) of the refractive index periodic structure permanently. Thereby, there are problems such that a loss due to imperfection of production precision in each boundary surface between the refractive index periodic structures becomes large, and that non-radiative recombination likely occurs on the boundary surface between the refractive index periodic structure and the active layer. The semiconductor laser shown in the document 7 also has a similar structure, such that the active layer is divided into sections by the refractive index periodic structures, and hence there are the same problems as in the document 3.

In the photonic crystal laser shown in the document 4, a point defect is introduced into the two-dimensional refractive index periodic structure, but since it is a point defect, there are problems such that the volume of the active layer is small, and it is difficult to obtain high output of the laser to be oscillated essentially and from the standpoint of cooling. Therefore, in this document 4, even if the size of the point defect that becomes the active region, is enlarged by filling the air holes constituting a plurality of adjacent refractive index periodic structures, in order to realize high output of the oscillation laser, a higher mode occurs, and a low-order single mode cannot be obtained. As a result, a high-quality resonator cannot be obtained. This photonic crystal laser realizes vertical confinement of laser beams with respect to the layered plane of the photonic crystal, by a photonic band gap due to the two-dimensional refractive index periodic structure, and fetch of the laser beams is carried out vertically of the upper and lower slabs. In other words, though the laser resonator performance for confining the laser beams and fetch of the laser output are theoretically contradicting structures, the photonic crystal laser tries to realize those two at the same position, that is, at the point defect, being the active region. As a result, there is a problem in that high-output laser cannot be obtained.

In the conventional techniques described above, only a laser is mentioned as the optical active device, and application to other optical active devices of photonic crystals has not been disclosed at all.

SUMMARY OF THE INVENTION

The optical active device according to the present invention has a two-dimensional slab photonic crystal structure, in which a slab layer having two-dimensional expanse and formed by laminating an active layer and a cladding layer, has a periodic refractive-index distribution structure in a two-dimensional plane. The slab layer includes a waveguide formed by introducing a first linear defect region in the periodic refractive-index distribution structure.

These and other objects, features and advantages of the present invention are specifically set forth in or will become apparent from the following detailed descriptions of the invention when read in conjunction with the accompanying drawings.

DETAILED DESCRIPTIONS

Exemplary embodiments of the optical active device according to the present invention are explained below in detail, with reference to the accompanying drawings. In this invention, the optical active device stands for a laser, an optical modulator or an optical switching element that can actively change and control the properties and functions of the optical device.

Figure 1:
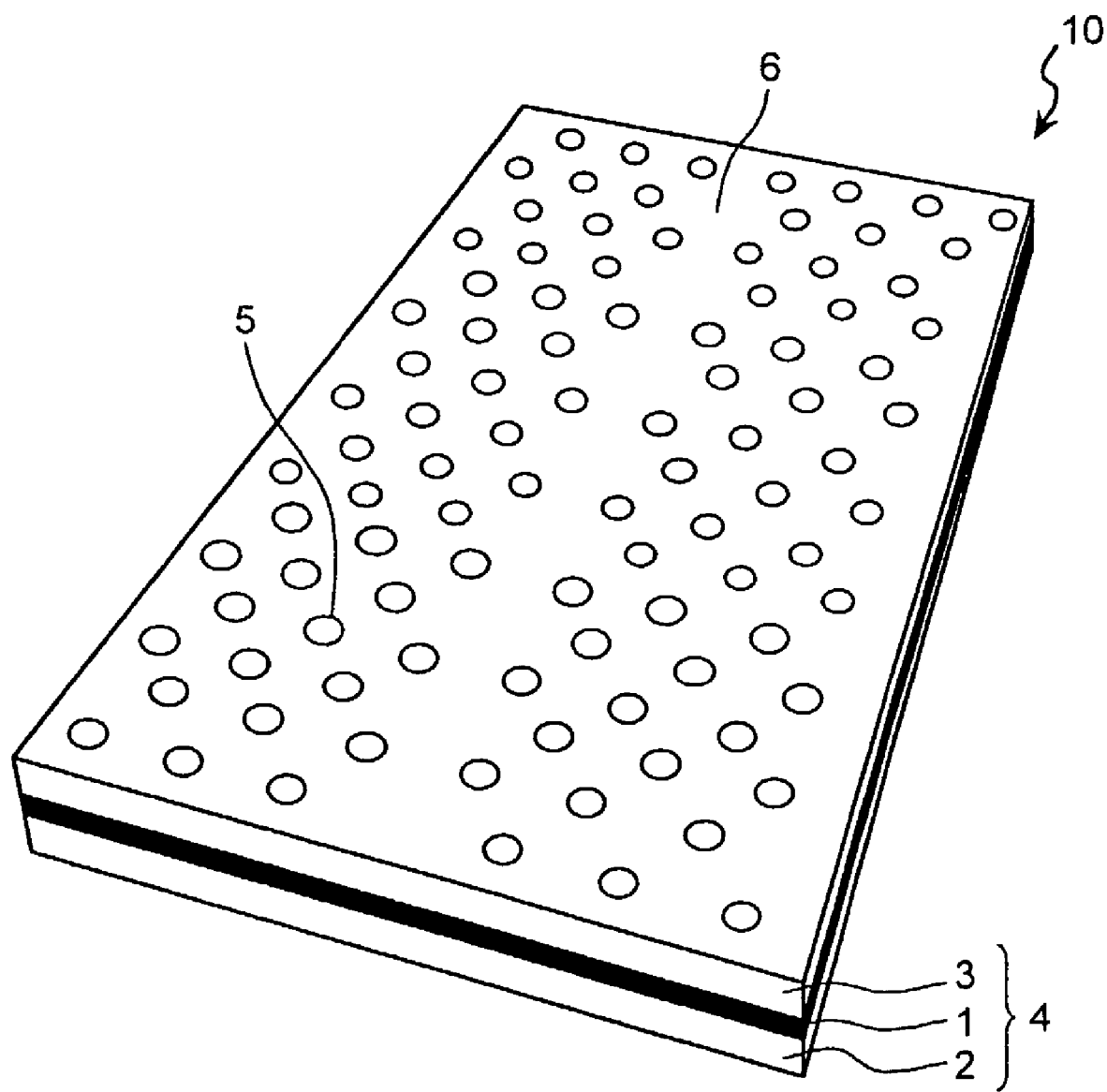
FIG. 1 is a perspective view that shows the configuration of a first embodiment of an optical active device according to the present invention.

FIG. 1 is a perspective view that shows the configuration of a first embodiment of the optical active device according to the present invention. The optical active device 10 according to this invention is constructed by forming triangular lattice-form periodic air hole structures 5 in a two-dimensional plane of a slab layer 4 formed by sequentially laminating a lower cladding layer 2 comprising InGaAsP, an active layer 1 having a multiple quantum well (hereinafter "MQW") structure comprising InGaAsP, and an upper cladding layer 3 comprising InGaAsP on a substrate (not shown) comprising InP or the like, so as to go through the slab layer 4 in a direction of lamination. A defect (a linear defect with respect to the two-dimensional periodic structure) 6 in which the periodic air hole structures 5 in this two-dimensional plane are linearly broken is further formed. By the periodic air hole structure 5 in the two-dimensional plane formed in the slab layer 4, a periodic refractive index distribution structure is formed in the slab layer 4.

As described above, the basis of the configuration of the optical active device 10 used in the present invention is a compound semiconductor having the active layer 1 having a multiple quantum well structure, and the cladding layers 2 and 3 that put the upper and lower faces of the active layer 1 therebetween. Therefore, an example in which InGaAsP is used for the active layer 1 and the cladding layers 2 and 3 is shown in FIG. 1. However, the general compound semiconductor can be used as a material for forming the active layer 1 and the cladding layers 2 and 3. Specifically, a bulk such as InGaAsP, GaAs, GaP, GaInP, AlGaInP, GaAsP, and GaN or MQW can be used for the active layer 1, and GaAs, AlGaAs, AlGaInP, InGaAsP, InP, and GaN can be used for the cladding layers 2 and 3.

Figure 2A:
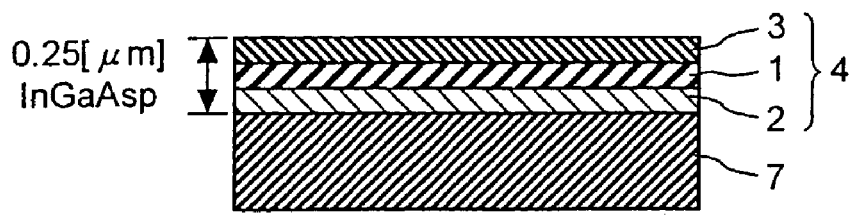
FIGS. 2A to 2E are sectional views that schematically show a production method of the optical active device.

FIGS. 2A to 2E are sectional views that schematically show a production method of the optical active device, including the two-dimensional slab photonic crystal structure shown in FIG. 1. At first, an InGaAsP layer that becomes the lower cladding layer 2 and has a relatively large energy band gap, is allowed to grow into a thin film on an InP substrate 7, using a crystal growth device such as a metal-organic chemical vapor deposition (hereinafter "MOCVD") device or a molecular beam epitaxy (hereinafter "MBE") device. The active layer 1 formed of a quantum well layer comprising InGaAsP and having a relatively small energy band gap compared to the lower cladding layer 2, that is, having a slightly different composition ratio from that of the lower cladding layer 2, and a barrier layer, is then allowed to grow into a thin film by using a crystal growth device such as the MOCVD and MBE. The film thickness of the quantum well layer and the barrier layer, the number of layers, and the energy band gap value at this time determine the emission wavelength band. Therefore, this active layer 1 is formed so as to match the wavelength band of the two-dimensional slab photonic crystal structure and the wavelength band required for the optical active device 10 to be produced. Further, an InGaAsP layer that becomes the upper cladding layer 3 having a relatively large energy band gap, is allowed to grow into a thin film on the active layer 1, using a crystal growth device such as the MOCVD and MBE. The state in which the lower cladding layer 2, the active layer 1, and the upper cladding layer 3 are formed on the substrate 7 in this manner is shown in FIG. 2A.

Figure 2B:
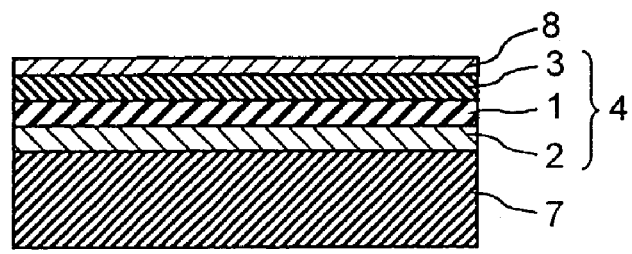

As shown in FIG. 2B, a resist 8 for electron beam (hereinafter "EB") exposure comprising an organic material is applied on the InGaAsP upper cladding layer 3 formed by the epitaxial growth on the substrate 7 in the process.

Figure 2C:
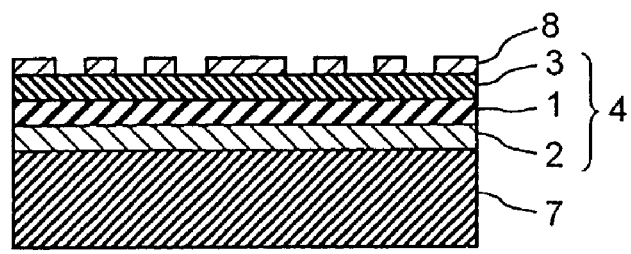

As shown in FIG. 2C, a pattern for forming the refractive index periodic structure including the defect structure (in this case, the air hole structure 5 having a periodic structure in the two-dimensional plane) is drawn by an EB exposure machine. The resist 8 for EB exposure in a region where the refractive index periodic structure is formed is then removed, leaving the resist 8 for EB exposure other than the region where the refractive index periodic structure is formed.

Figure 2D:
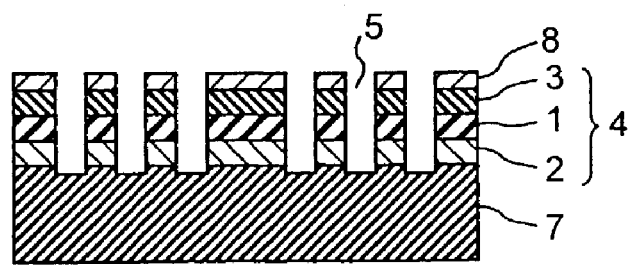

As shown in FIG. 2D, etching is performed so as to go through the InGaAsP layer from the upper cladding layer 3 to the lower cladding layer 2 and reach the upper layer of the substrate 7, according to the pattern, by an etching device such as a reactive ion etching (hereinafter "RIE") device or an induced coupled plasma etching (hereinafter "ICPE") device, to thereby form the air hole structures 5. The subsequent step of selectively removing only the substrate portion below the periodic structure can be carried out easily and adequately, by etching the substrate 7 to some extent at this time. Thereafter, the resist 8 for EB exposure applied on the region where the etching has not been carried out is removed.

Figure 2E:
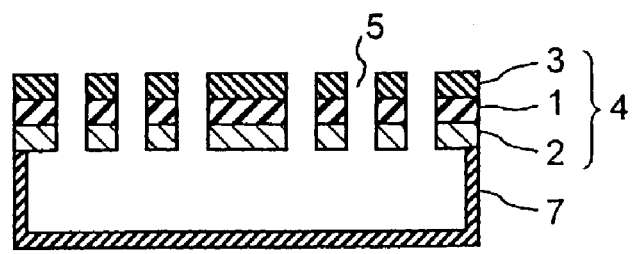

As shown in FIG. 2E, the optical active device 10 having a two-dimensional slab photonic crystal structure can be obtained by selectively removing only the portion of the substrate 7 below the air hole structures 5 by wet etching. At this time, the substrate 7 is in the state that the inside is hollow, and has a structure in which the peripheral portion of the sheet-form slab layer 4 is supported by the substrate 7. By such a structure, the upper and lower faces of the slab layer 4 contact with the air.

FIGS. 2A to 2E show only examples of the production method of the optical active device 10 according to the present invention, and the optical active device 10 may be produced using other production methods. For example, a dielectric mask or a metal mask layer comprising a dielectric film such as $SiN_x$ or $SiO_2$, or a metal film such as Ti is vacuum-evaporated, on the lower cladding layer 2, the active layer 1 and the upper cladding layer 3 sequentially formed on the substrate 7, as shown in FIG. 2A. A pattern for forming a refractive index periodic structure including a defect structure (in this case, periodic air hole structures 5) is then formed on the dielectric mask or the metal mask layer, by a photo-etching process or an electron beam etching process. Etching is carried out according to this pattern, so as to go through from the upper cladding layer 3 to the lower cladding layer 2 and reaches the upper layer of the substrate 7, and only the material of the substrate 7 constituting the lower part of the air hole structures 5 is selectively removed by wet etching that selectively removes the inside of the substrate 7. Lastly, the dielectric film or metal film where etching has not been performed is removed, to thereby obtain an optical active device having a two-dimensional slab photonic crystal structure.

Figure 3:
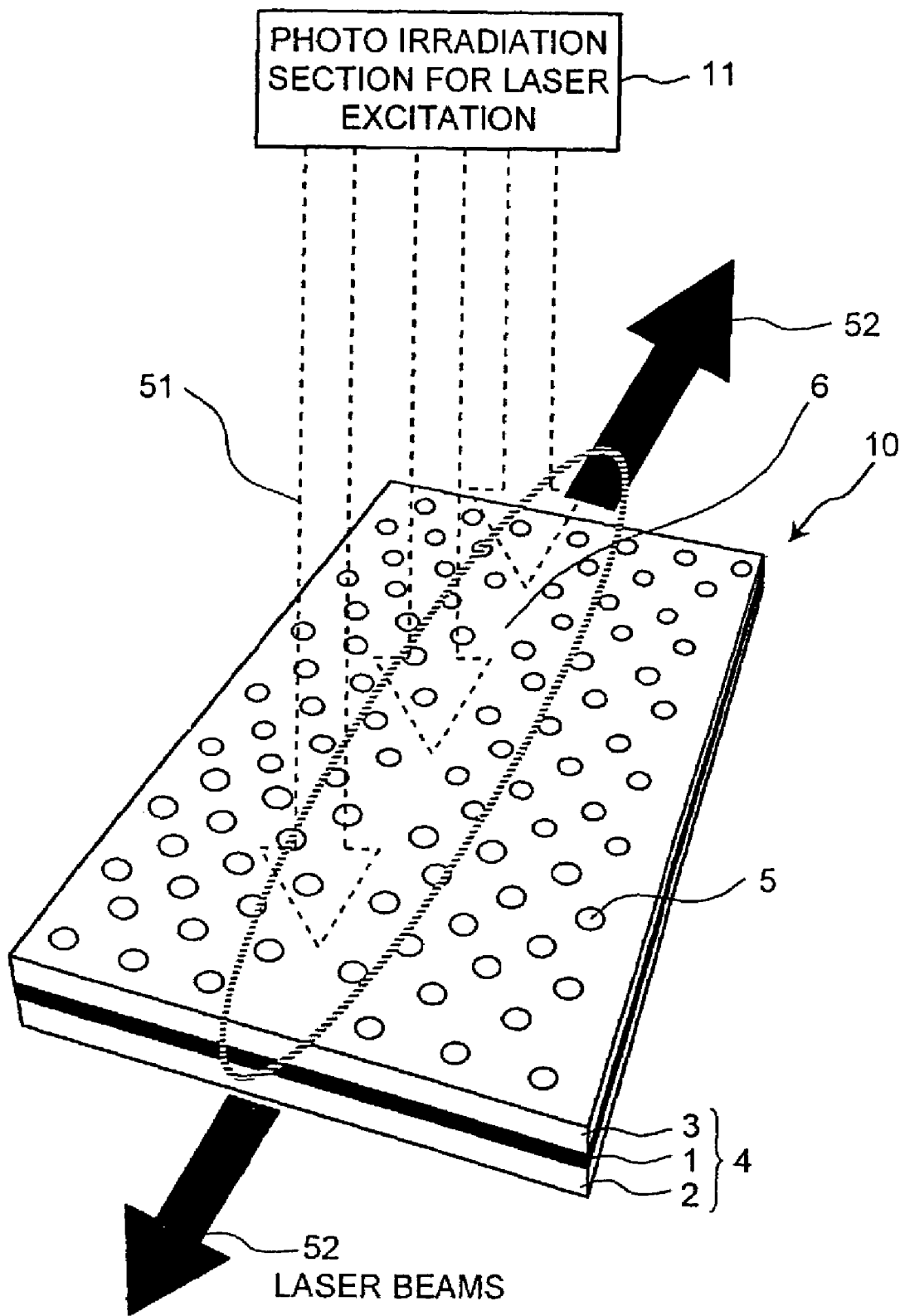
FIG. 3 is a schematic diagram that shows laser oscillation by photo excitation of the optical active device.

The operation of laser oscillation when the optical active device 10 formed in this manner is used as a semiconductor laser oscillator is explained below. FIG. 3 is a perspective view that schematically shows the configuration of the semiconductor laser oscillator that performs laser oscillation by photo excitation. This semiconductor laser oscillator has an optical active device 10 having a two-dimensional slab photonic crystal structure, and a photo irradiation section 11 for laser excitation that irradiates beams onto an active region formed on the optical active device 10. The active region stands for an area including mainly a linear defect region 6 formed in the optical active device 10.

The photo irradiation section 11 for laser excitation is composed of, for example, a diode, and is arranged in the linear defect region 6 from a direction vertical to the layered plane of the slab layer 4, so as to be able to irradiate light having a wavelength different from the laser oscillation wavelength as the exciting light 51. The optical active device 10 has a structure shown in FIG. 1. In FIG. 1, the substrate is omitted. The photo irradiation section 11 for laser excitation may be a laser diode or the like, and optimum irradiation condition can be realized by using a fiber, a lens or a reflection mirror as a light guiding unit.

Light formed by recombining electrons and holes generated in the active layer 1 by the exciting light 51 from the photo irradiation section 11 for laser excitation, is generated in the active layer 1. The light having occurred in the active layer 1 is confined by the structure in which the active layer 1 and the cladding layers 2 and 3, being a thin material slab region, is sandwiched between air cladding, that is, by the refractive index confinement that confines light vertically (in the up and down direction) with respect to each layered plane. The light generated in the active layer 1 cannot invade the refractive index periodic structure region, in an in-plane direction parallel with each layered plane, because of a photonic crystal band gap due to the refractive index periodic structure in a two-dimensional plane (in the case of FIG. 1, a triangular lattice-form air hole structure 5), in the in-plane direction parallel to each layered plane. As a result, the light generated in the active layer 1 is localized within the linear defect region 6, where the refractive index periodic structure is not formed. In other words, the linear defect region 6 serves as a waveguide.

Figure 4:
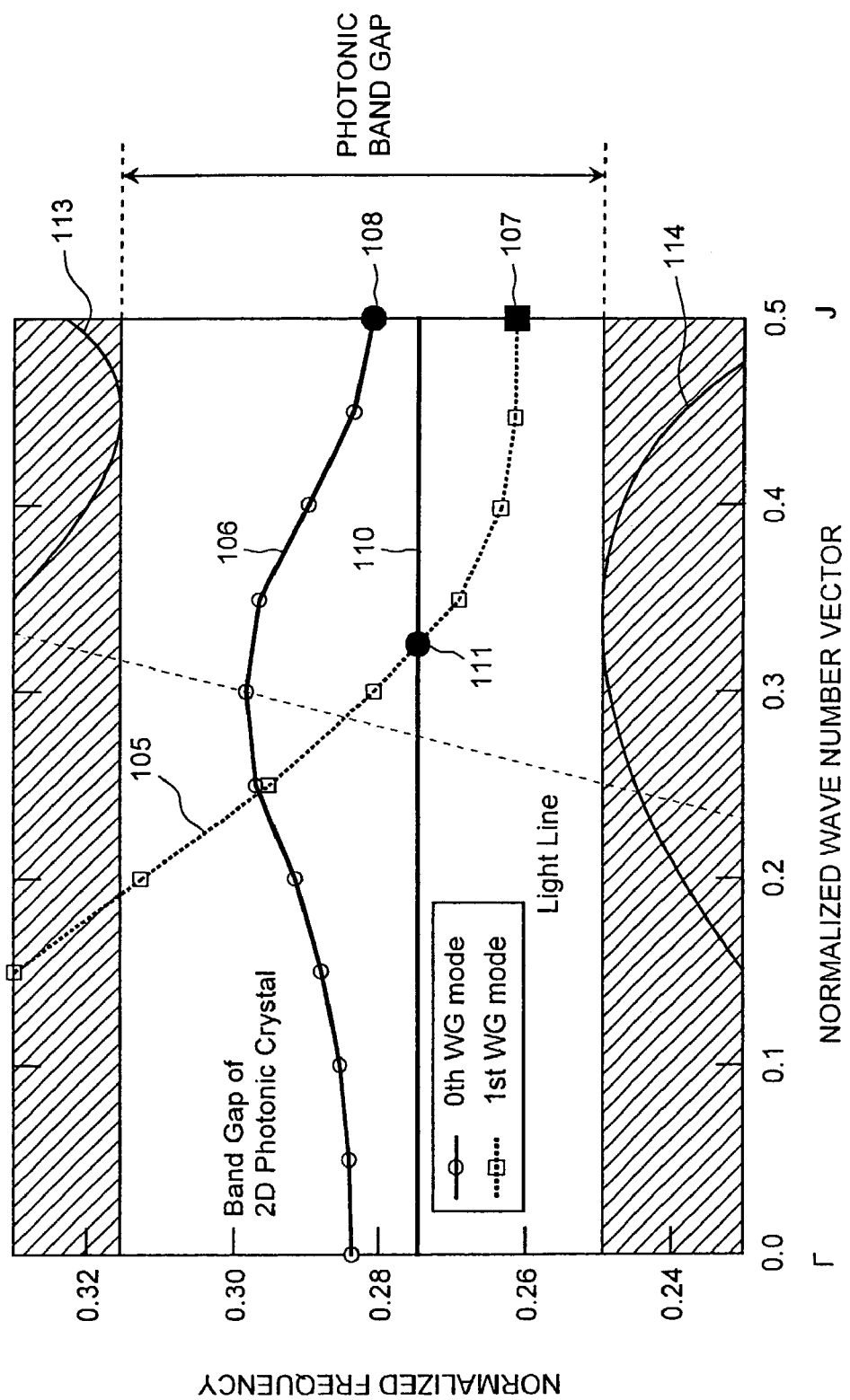
FIG. 4 is a band diagram of a two-dimensional slab photonic crystal according to this invention.

FIG. 4 shows a photonic band structural drawing of the optical active device according to this invention. The photonic band structure in this figure is applied to a two-dimensional slab photonic crystal having a triangular lattice-form periodic structure, as shown in FIG. 1, in which the periodic air hole structures 5 are formed the slab layer 4, wherein when it is assumed that the distance between centers of adjacent air hole structures 5 (that is, lattice period) is "a", and the radius of the air hole structure 5 is "r", $$R=0.29a \qquad (1)$$

Specifically, modes 113 and 114 are written as those representing bands in the photonic crystal mode, and many modes exist outside of the drawing, in the range of normalized frequency of not larger than 0.23, or not smaller than 0.33. Not the photonic crystal mode, but the defect mode will be discussed below, and hence the photonic crystal mode region is expressed by diagonal lines, for easy understanding of the photonic band gap region, where any photonic crystal mode does not exist in the normalized frequency. In the graph that shows this photonic band structure, for example, in the case of a lattice period a=0.42 [μm] of the air hole structure 5 in the two-dimensional slab photonic crystal, the normalized frequency v=0.27 [c/a] corresponds to a wavelength λ=1.555 [μm], and the normalized frequency v=0.28 [c/a] corresponds to a wavelength λ=1.500 [μm].

According to the photonic band theory, the light localized in the waveguide within the linear defect region 6 becomes a specific mode. In this embodiment, a mode suitable for the defect waveguide of the photonic band structure shown in FIG. 4 can exist in the waveguide within the linear defect region 6. The light internally generated in the active layer 1 causes optical resonance in the region where the group velocity at the band ends 107 and 108 in the linear defect waveguide modes 105 and 106 becomes 0, and a part of this resonated light generates laser oscillation as laser beams 52 from the end of the linear defect region 6 of the optical active device 10.

In FIG. 4, the photonic band gap in FIG. 4 can be shifted vertically, by changing the lattice period "a", the hole radius "r", or the material of the air hole structures 5 in the two-dimensional slab photonic crystal to change the refractive index. As a result, control becomes possible such that laser beams having a desired wavelength are oscillated. In other words, by setting the lattice period "a", the hole radius "r", or the material of the air hole structures 5 adequately with respect to the oscillation wavelength, a two-dimensional slab photonic crystal laser having an oscillation wavelength band in the infrared region of about 2 μm from the ultraviolet region can be realized.

In the explanation, an example in which light is used as the excitation source has been explained. However, a method by current excitation may be used, in which light is generated from the active layer 1 by flowing electric current to the active layer 1. In this case, laser beams are generated due to electron-hole recombination in the active layer 1, by allowing excitation current to flow to the MQW constituting the active layer 1.

Figure 5:
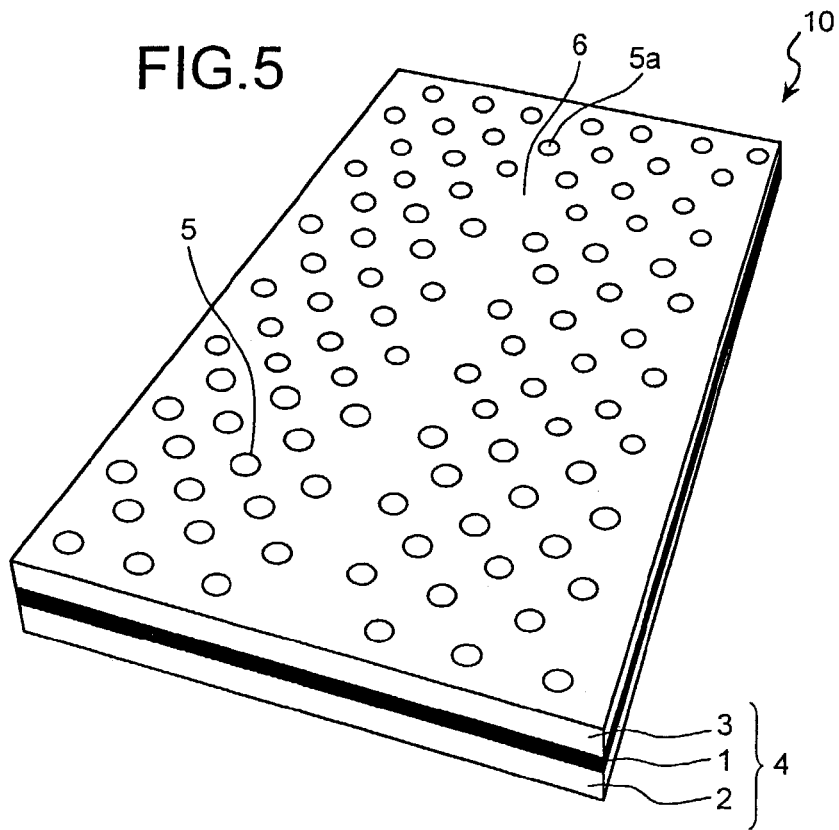
FIG. 5 is a perspective view of the optical active device, in which one end of the linear defect region is terminated.

In the semiconductor laser oscillator as shown in FIG. 3, laser beams are oscillated from a cross sectional portion of the slab layer 4 that becomes the both ends of the linear defect region 6. Therefore, as shown in FIG. 5, at the time of forming the linear defect region 6, one end of the linear defect region 6 is terminated by a two-dimensional refractive index periodic structure, more specifically, the air hole structure 5a is provided at one end of the linear defect region 6, so as to maintain the periodicity with the peripheral air hole structures 5. Thereby, the light cannot propagate through this portion, and amplified laser beams are emitted only from the end opposite to the end where this air hole structure 5a is formed. As a result, high-output semiconductor laser oscillator can be obtained, with the loss further reduced. Only the air hole structure 5a is shown here, but a plurality of periodic air hole structures 5a may be formed in order to suppress leakage of the optical electric field from one end and confine the light efficiently.

According to the first embodiment, the periodic air hole structures 5 are formed in the slab layer 4 having a configuration such that the active layer 1 is sandwiched between the cladding layers 2 and 3, so as to go through the layered plane, and an optical active device is formed so that a linear defect region 6 is provided in a part of the air hole structures 5. As a result, laser oscillation is generated at the band end in the two-dimensional photonic crystal waveguide mode. Therefore, the waveguide mode of the lowest degree shown in FIG. 4 has a low loss, since the expanse of the beams in the waveguide is small, and hence mode selection can be performed in line with the purpose of fetching the laser output. Further, since the active layer 1 in the waveguide portion that does not cross the periodic refractive index boundaries mainly contributes to the laser amplification, high output and high efficiency can be obtained, while maintaining the high two-dimensional photonic crystal properties. Since the band-end oscillation in the waveguide mode is used, high output can be achieved without impairing the modal property, by extending the waveguide length. Further, since fetch of laser output and vertical confinement (within the two-dimensional plane) of the optical electric field are independent of each other, a high-quality laser resonator can be obtained, by which laser oscillation only in a desired mode can be obtained. There is also the effect that a compound semiconductor and a resonator can be integrally formed.

In the first embodiment, it has been explained that a semiconductor laser oscillator that can realize optical control based on the photonic band theory, is formed by an optical active device having a two-dimensional slab photonic crystal structure in which the photonic band theory shown in FIG. 4 becomes effective. For example, the refractive index of a slab layer, in which InGaAsP is used for the cladding layers 2 and 3, and the overall thickness of the slab layer 4 including the active layer 1 and the cladding layer 2 is 0.25 µm, becomes about 3.3 with respect to refractive index 1 of the upper and lower air layers, in the wavelength band of from 1.3 to 1.7 µm. In such an optical active device, refractive index confinement can be realized such that at least 70% of the optical electric field strength distribution in the vertical (up and down) direction is confined within the slab layer 4. Generally, the optical control can be realized by the photonic band theory by the two-dimensional slab photonic crystal structure, when the refractive index confinement of the optical electric field strength distribution in the vertical direction with respect to the optical electric field is about 30%, and when the confinement is less than 30%, it is necessary to introduce a unit that performs three-dimensional optical control.

Figure 6:
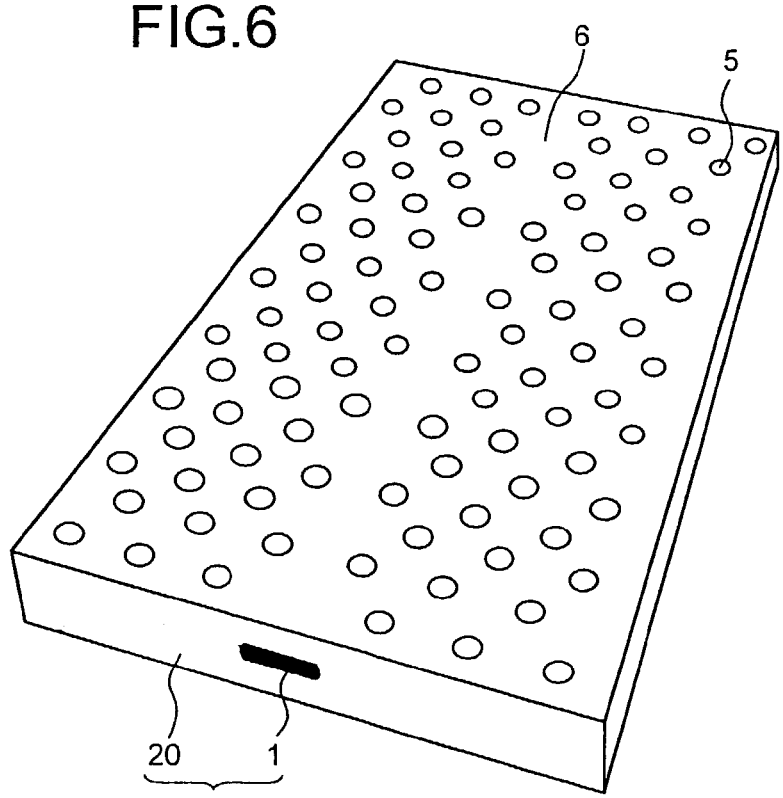
FIG. 6 is a perspective view that shows the configuration of a second embodiment of the optical active device according to the present invention.

FIG. 6 is a perspective view that shows the configuration of a second embodiment of the optical active device according to the present invention. As shown in FIG. 6, the optical active device is constructed such that the active layer 1 exists only in the linear defect region 6 formed in a two-dimensional plane of a cladding layer 20, and the active layer 1 does not exist in the region of the air hole structures 5 for forming the refractive index periodic structure.

Figure 7A:
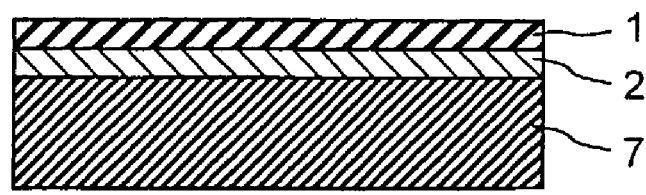
FIGS. 7A to 7E are sectional views that schematically show a production method of the optical active device.

FIGS. 7A to 7E are sectional views that schematically show a production method of the optical active device composed of the two-dimensional slab photonic crystal structure shown in FIG. 6. Here, an example in which InP is used for the substrate, and InGaAsP is used for the active layer 1 and the cladding layer 20 is explained. As shown in FIG. 7A, the lower cladding layer 2 consisting of InGaAsP, and the active layer 1 consisting of InGaAsP, in which the film thickness of the quantum well layer and the barrier layer, the number of layers, and the energy band gap are set so that light having a desired wavelength zone can be obtained, are formed on the InP substrate 7 in order, by using a crystal growth device such as the MOCVD or MBE.

Figure 7B:
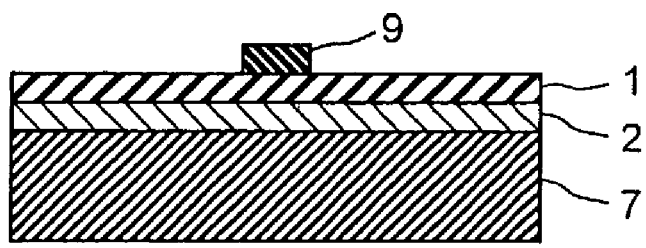

As shown in FIG. 7B, a linear mask 9 corresponding to the linear active layer described later is formed of a dielectric film such as $SiO_2$ or $SiN_x$, on the active layer 1 consisting of InGaAsP. At this time, a positioning mark is formed at the same time, for adjusting the position of the waveguide pattern in the linear defect region to be introduced in the two-dimensional slab photonic crystal in the subsequent step.

Figure 7C:
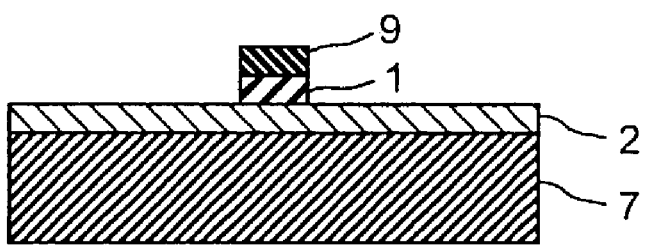

As shown in FIG. 7C, a portion of the active layer 1 where the linear mask 9 is not formed is removed up to the lowermost layer of the active layer 1, by an etching apparatus such as RIE or ICPE, or wet etching. Thereby, a linear active layer 1 is formed. Thereafter, the linear mask 9 is removed.

Figure 7D:
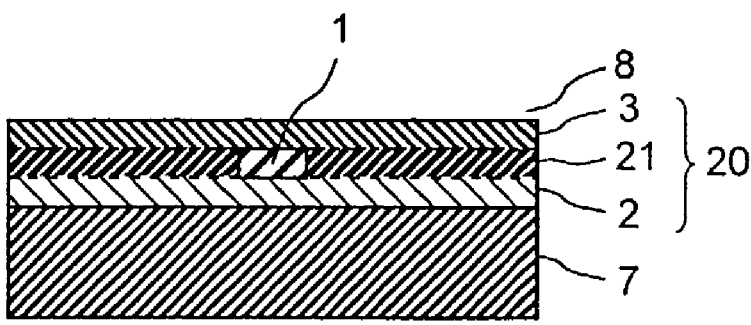

As shown in FIG. 7D, a lateral cladding layer 21 consisting of an InGaAsP layer having a relatively large energy band gap is formed, and then, a cladding layer 3 consisting of an InGaAsP layer is formed on the active layer 1 consisting of a quantum well layer and a barrier layer, and the lateral cladding layer 21, using a crystal growth device such as MOCVD or MBE. Here, a layer combining the lower cladding layer 2, the lateral cladding layer 21 and the upper cladding layer 3 is referred to as a cladding layer 20.

Figure 7E:
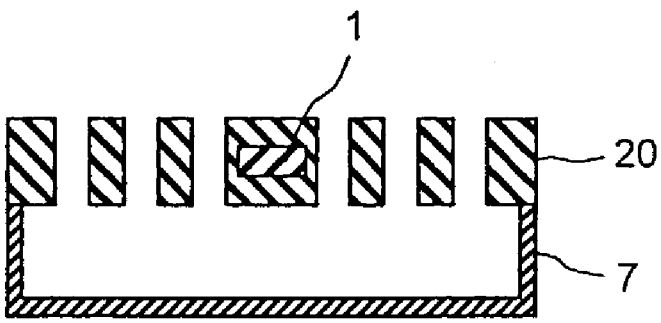

Thereafter, as explained with reference to FIGS. 2B to 2E in the first embodiment, the air hole structures 5 having the two-dimensional periodic structure are formed in the portion other than the portion where the linear active layer 1 is formed, by the photo etching process, and only InP of the substrate 7 constituting the lower part of the air hole structures 5 is selectively removed by wet etching. Thereby, the optical active device shown in FIG. 7E is obtained. At the time of forming the air hole structures 5, the position of the linear defect region 6 constituting the linear defect waveguide is adjusted by the positioning mark formed in FIG. 7B.

In the optical active device having such a configuration, the active layer 1 is formed linearly, and the linear defect region 6 is formed on the upper part of the active layer 1. Therefore, carrier confinement in the linear defect region 6 becomes possible, and hence a more efficient semiconductor laser oscillator can be realized.

Figure 8:
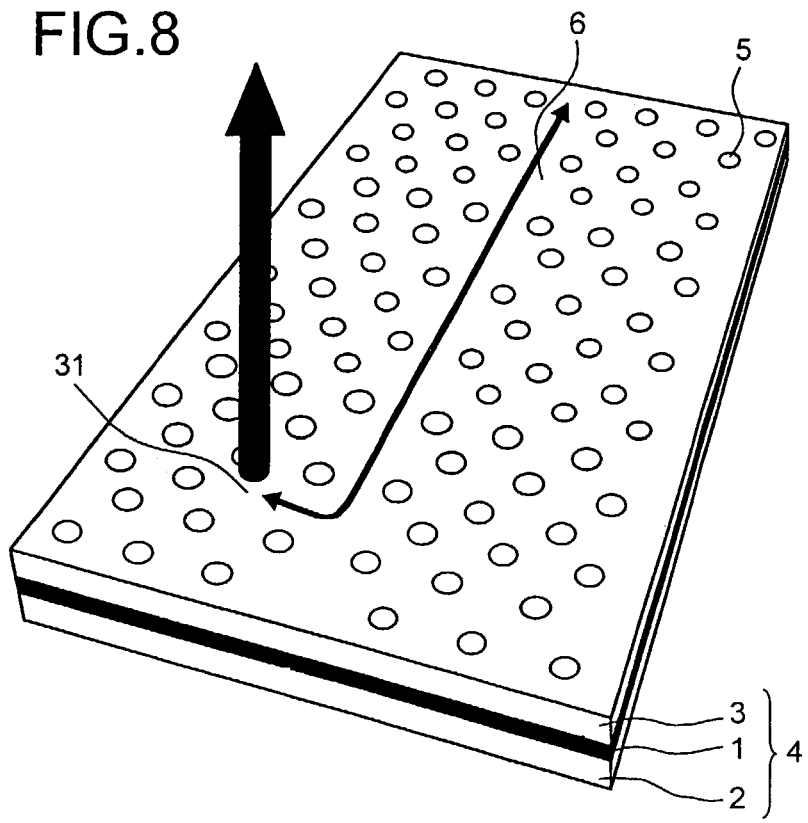
FIG. 8 is a perspective view that shows the configuration of a third embodiment of the optical active device according to the present invention.

FIG. 8 is a perspective view that shows the configuration of a third embodiment of the optical active device according to the present invention. In FIG. 8, only one portion of the periodic air hole structure 5 in the two-dimensional plane is broken, in FIG. 1 in the first embodiment, to thereby introduce a point defect (point defect with respect to the periodic structure) 31. The same constituents as those of the first embodiment are denoted by the same reference symbols, and the explanation thereof is omitted.

In the case of the point defect, it is known that the resonance mode shows a constant frequency regardless of the wave number vector. A line 110 in FIG. 4 shows an example of a specific point defect mode. When a specific point defect is arranged near the waveguide, the point defect mode and the linear defect mode interact with each other, to form a compound resonator. As is seen from FIG. 4, this compound resonator operates at a frequency common to these point defect mode and linear defect mode (that is, a point of intersection of the both modes in FIG. 4) 111, thereby enabling laser oscillation, instead of a single resonator using a waveguide formed by the linear defect region 6 in FIG. 1. The point defect mode slightly changes from a single resonance frequency corresponding to the degree of the interaction, at the time of interacting with the waveguide formed by the linear defect region 6. Hence, it is necessary to design, taking this change into consideration.

Figure 9:
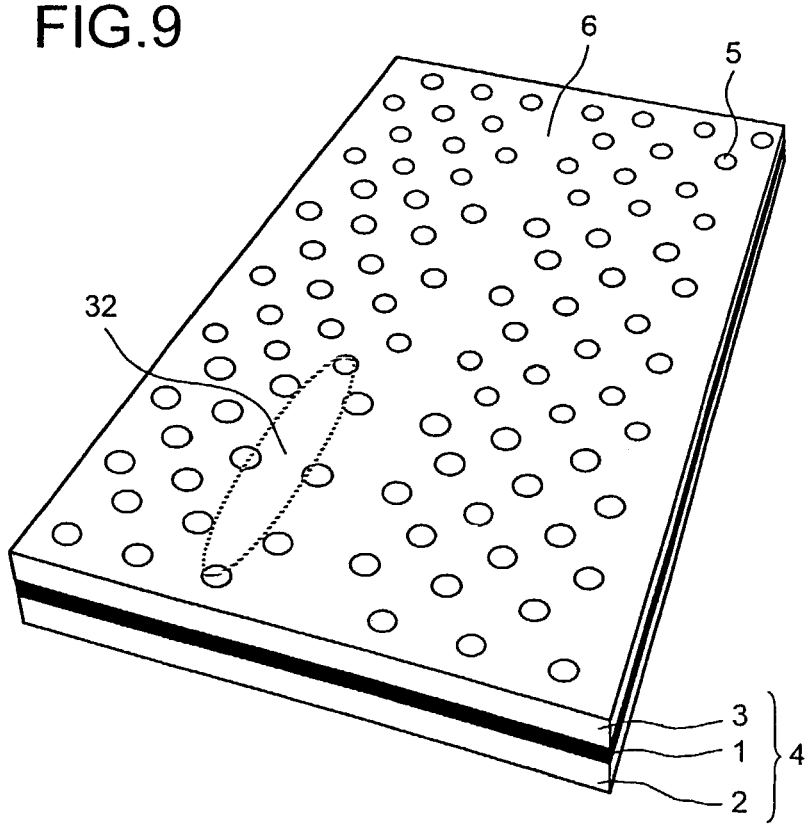
FIG. 9 is a schema that shows a state in which an isolated defect is introduced in the optical active device.

In FIG. 8, an example in which only one portion of the periodic air hole structure 5 in the two-dimensional plane is broken to introduce a point defect has been explained. However, two portions of the adjacent air hole structures 5 may be broken to introduce an isolated defect (hereinafter "isolated defect"). FIG. 9 shows an optical active device, when adjacent two air hole structures are broken to introduce the isolated defect. As shown in FIG. 9, even when an isolated defect 32 obtained by breaking adjacent two air hole structures 5 is introduced, laser oscillation becomes possible instead of a single resonator using a waveguide formed by the linear defect region 6 in FIG. 1. In this case, since the frequency of the defect mode 110 in the photonic band structural drawing in FIG. 4 takes a different value from that of the point defect 31, the freedom in designing of the resonator parameter can be enlarged.

A point (isolated) defect interacting with the waveguide formed by the linear defect region 6 in a desired mode can be formed by a method in which, of the periodic air hole structures 5 in the two-dimensional plane, a plurality of, at least three, air hole structures 5 adjacent not only on a line but also vertically and horizontally on the two-dimensional plane are broken to form an isolated defect, a method of forming an air hole structures 5 having a different diameter in a periodic air hole structure 5, a method of slightly shifting the position of the air hole structure 5 from a predetermined position, or a method of changing a relative position with respect to a waveguide formed by the linear defect region 6 of a point (isolated) defect.

Figure 10:
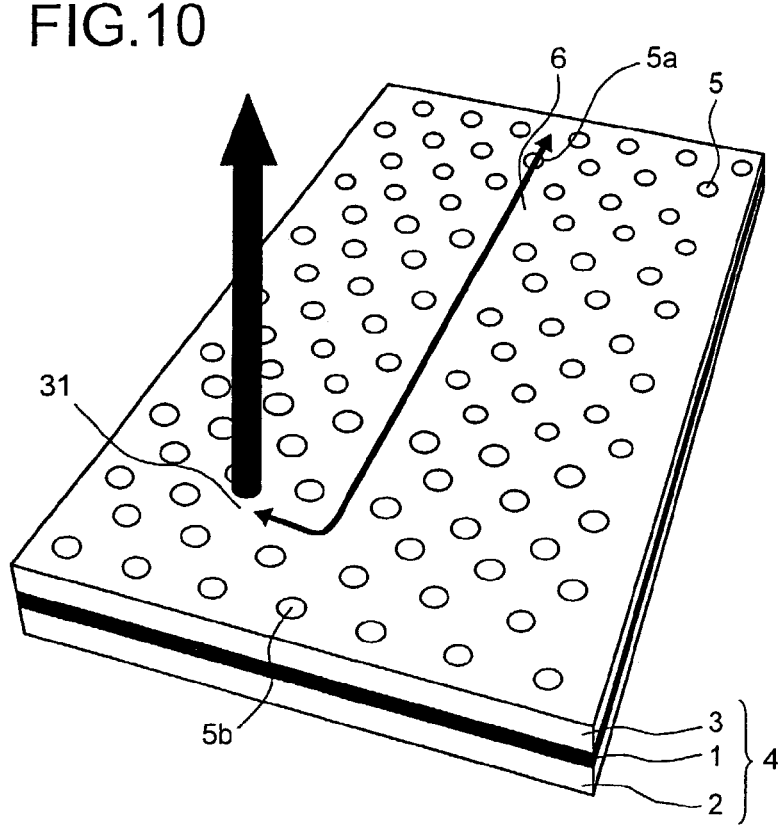
FIG. 10 is a perspective view that shows an optical active device that oscillates laser beams from a point (isolated) defect.

In the third embodiment, laser oscillation from the edge of the linear defect region 6 or from the point (isolated) defect 31 or 32 becomes possible, by adequately designing the position of the linear defect region 6 and the point (isolated) defect 31 or 32. FIG. 10 is a perspective view that shows the structure of an optical active device, when laser oscillation is generated from a point (isolated) defect. As shown in FIG. 10, when the both ends of the linear defect region 6 are terminated by the two-dimensional refractive index periodic structure, more specifically, when air hole structures 5a and 5b are provided at the both ends of the linear defect region 6, so as to match with the period of the ambient air hole structures 5, the light cannot propagate to the ends of the linear defect region 6, and the amplified laser beams are emitted only from the point (isolated) defect 31 where the compound resonator is formed. By such a configuration, a high-output laser device with lesser loss can be obtained.

When a compound resonator is formed of the point (isolated) defect 31 and the linear defect region 6, only one end of the linear defect region 6 is terminated by the two-dimensional refractive index periodic structure, and the connection between the compound resonators by the point (isolated) defect 31 and the linear defect region 6 is weakened, thereby amplified laser beams can be emitted relatively easily from the other end of the linear defect region 6, which is not terminated. As a result, the laser oscillation output can be selectively fetched from the waveguide by the linear defect region 6. As a method of weakening the connection between compound resonators by the point (isolated) defect 31 and the linear defect region 6, a method of inserting another material between the both defects, or a method of separating the position of the point (isolated) defect 31 from the linear defect region 6 can be used. In this configuration, by introducing external light from the point (isolated) defect 31, and amplifying the light by the compound resonator to thereby output only the resonant wavelength from the point (isolated) defect 31, a wavelength-selection optical amplifier can be constructed as an active device.

Figure 11:
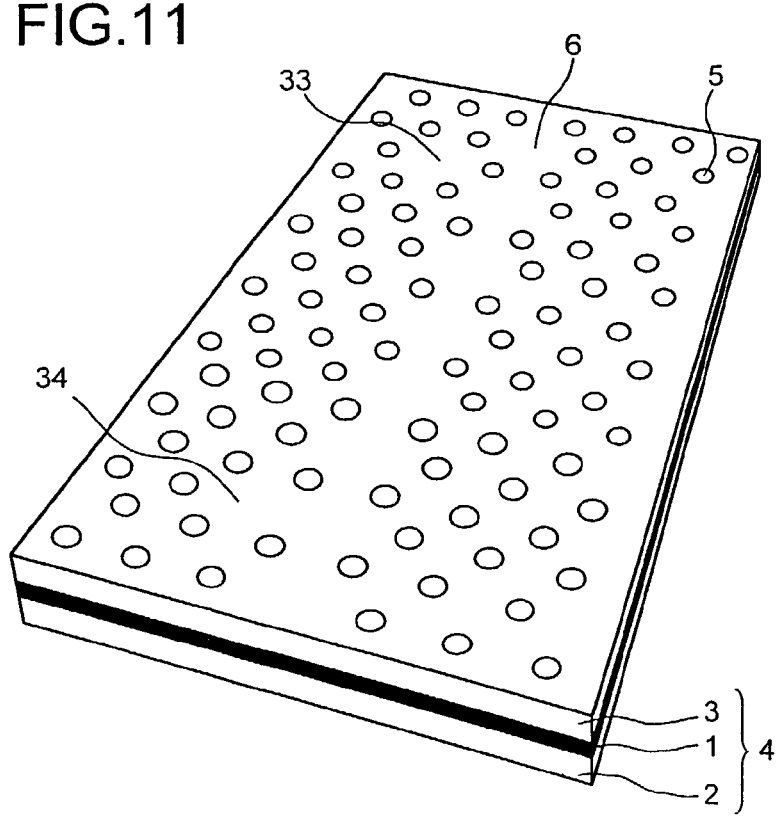
FIG. 11 is a perspective view that schematically shows the configuration of a fourth embodiment of the optical active device according to the present invention.

FIG. 11 is a perspective view that schematically shows the configuration of a fourth embodiment of the optical active device according to the present invention. In FIG. 11, point defects or isolated defects 33 and 34 are introduced in two places in the periodic air hole structures 5 in the two-dimensional plane, in FIG. 1 of the first embodiment. The same constituents as those of the first embodiment are denoted by the same reference symbols, and the explanation thereof is omitted.

These two point (isolated) defects 33, 34 are arranged near the linear defect region 6, so as to interact with the waveguide formed by the linear defect region 6. In this manner, the point (isolated) defects 33 and 34 can constitute a laser resonator via the linear defect region 6. Further, in this configuration, external light is introduced from the point (isolated) defect 33 or the point (isolated) defect 34 and amplified by the compound resonator, thereby a wavelength-selection optical amplifier can be constructed as an active device.

Figure 12:
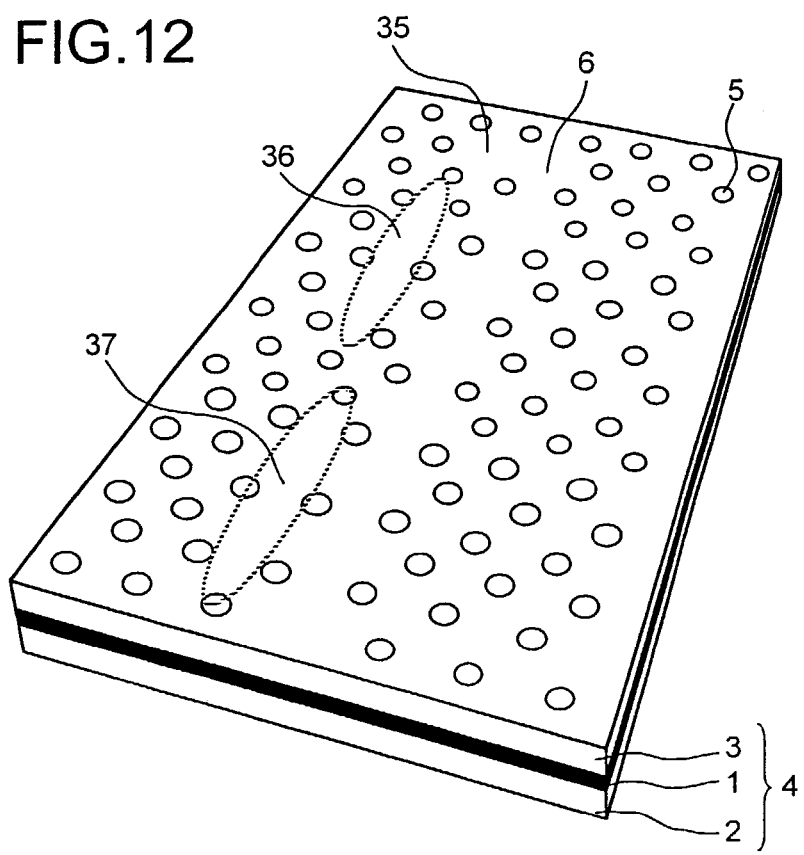
FIG. 12 is a schema that shows a state in which a plurality of point defects or isolated defects is introduced in the optical active device.

An example has been explained above in which the point (isolated) defects 33 and 34 are introduced at two places in the periodic air hole structures 5 in the two-dimensional plane. However, the point (isolated) defects may be introduced in more than three places in the periodic air hole structures 5 in the two-dimensional plane. FIG. 12 shows an example in which point (isolated) defects 35 to 37 are introduced in three places in the periodic air hole structure 5 in the two-dimensional plane of an optical active device.

These point (isolated) defects 35 to 37 resonate via a waveguide respectively formed by the linear defect region 6. In this case, by designing such that the point defect 35 is for example a point defect having a wide spectral band width (having a small Q value), in which one air hole structure 5 is eliminated, and the isolated defects 36 and 37 are ones having a narrow spectral band width (having a large Q value), in which two air hole structures 5 are eliminated, having a different resonance point from each other, and located within the spectral band of the point defect 35, a laser resonator can be formed, which oscillates at different wavelengths from each of the isolated defects 36 and 37.

In FIG. 12, an example of designing a laser resonator that oscillates two different wavelengths, has been explained. However, by further increasing the number of point defects or isolated defects, a laser resonator having different wavelengths by desired numbers can be formed. Further, by introducing external light from the point defect 35, and amplifying the light by the compound resonator, a wavelength-selection optical amplifier can be constructed as an active device that selects and amplifies only a plurality of specific wavelengths from the isolated defects 36 and 37.

If the refractive index of the point (isolated) defect 31 or the refractive index near the point (isolated) defect 31 shown in FIG. 8 of the third embodiment, is controlled independently of the linear defect region 6, using light, electricity, heat, sound, stress, or physical deformation, a wavelength variable laser resonator can be realized. This is because the refractive index is a controlling factor that determines optical properties in the photonic crystals. Here, as the means for controlling the refractive index by using light, electricity, heat, sound, stress, or physical deformation, specifically, it is possible to use refractive index fluctuations through the photo refractive effect by light, refractive index fluctuations through the Frantz-Keldysh effect by the electric field, refractive index fluctuations through the Kramers-Kroning effect with a band change due to the quantum Stark effect, refractive index fluctuations through the electro-optical effect due to the electric field, refractive index fluctuations through the acousto-optic effect by acoustic waves, and refractive index fluctuations by adding stress by a minute pin or the like.

Figure 13:
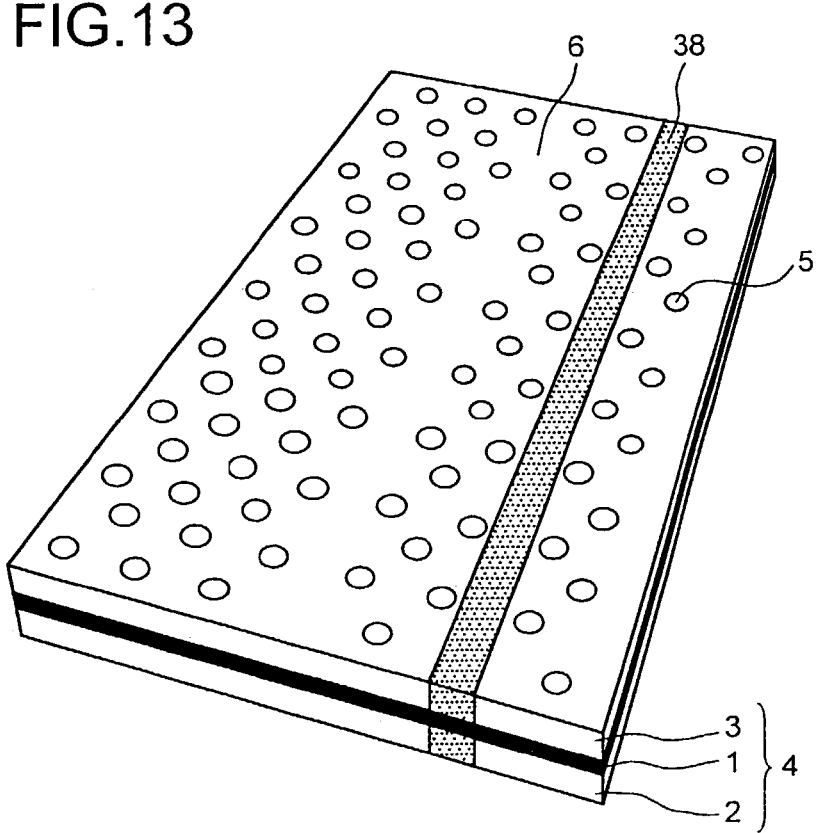
FIG. 13 is a perspective view that schematically shows the configuration of a fifth embodiment of the optical active device according to the present invention.

FIG. 13 is a perspective view that schematically shows the configuration of a fifth embodiment of the optical active device according to the present invention. In FIG. 13, a second linear defect region 38 is arranged, instead of the point (isolated) defect 31 in FIG. 8 of the third embodiment. The second linear defect region 38 has a different composition from that of in other regions, by an ion injection process in the semiconductor manufacturing. In other words, the second linear defect region 38 has properties different from those in other regions in the slab layer 4.

In this manner, if light, electricity, heat, sound, stress, or physical deformation is allowed to act on the whole surface of the optical active device 10, with only the second linear defect region 38 being formed to have a composition different from others, the refractive index fluctuation in the second linear defect region 38 becomes different from that in other regions. Further, the refractive index fluctuation can be adjusted by changing the influence of the light, electricity, heat, sound, stress, or physical deformation. As described above, by changing the excitation state of the active layer 1 in the second linear defect region 38 by optical excitation or current excitation, the effective refractive index thereof can be changed due to the Kramers-Kroning relations, and hence a wavelength variable laser resonator having larger interaction with the linear defect region 6 can be realized.

Figure 14:
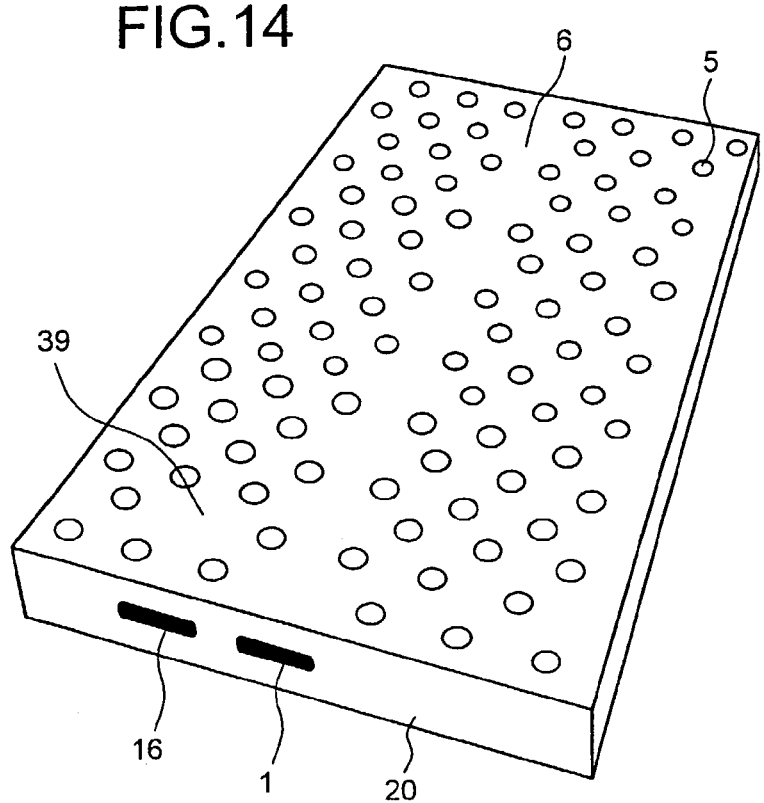
FIG. 14 is a perspective view that schematically shows the configuration of a sixth embodiment of the optical active device according to the present invention.

FIG. 14 is a perspective view that schematically shows the configuration of a sixth embodiment of the optical active device according to the present invention. In FIG. 14, a point (isolated) defect 39 is introduced at one place in the periodic air hole structures 5 in the two-dimensional plane, in FIG. 6 of the second embodiment, and an active layer 16 is further formed below the point (isolated) defect 39, separately from the active layer 1 formed below the linear defect region 6. Such an optical active device can be produced by the same method as that explained in the second embodiment.

According to the optical active device having such a configuration, the refractive index of the point (isolated) defect 39 can be changed more easily, independently of the linear defect region 6, as compared with the fifth embodiment. Thereby, by changing the excitation state of the active layer 16 by optical excitation or current excitation, the effective refractive index thereof can be changed due to the Kramers-Kroning relations, and hence a wavelength variable laser resonator having larger interaction with the linear defect region 6 can be realized.

In FIG. 8 that shows the third embodiment or in FIG. 14 that shows the sixth embodiment, the refractive index in the region between the linear defect region 6 and the point (isolated) defects 31 and 39 is controlled by using the light, electricity, heat, sound, stress, or physical deformation, thereby the mode of the point (isolated) defects 31 and 39 that interacts with the linear defect region 6 can be changed. As a result, a wavelength variable laser resonator can be realized.

As a seventh embodiment, as the means for controlling the refractive index by using light, electricity, heat, sound, stress, or physical deformation, specifically, it is possible to use refractive index fluctuations through the photo refractive effect by light, refractive index fluctuations through the Frantz-Keldysh effect by the electric field, refractive index fluctuations through the Kramers-Kroning effect with a band change due to the quantum Stark effect, refractive index fluctuations through the electro-optical effect due to the electric field, refractive index fluctuations through the acousto-optic effect by acoustic waves, and refractive index fluctuations by adding a stress by a minute pin or the like.

Figure 15:
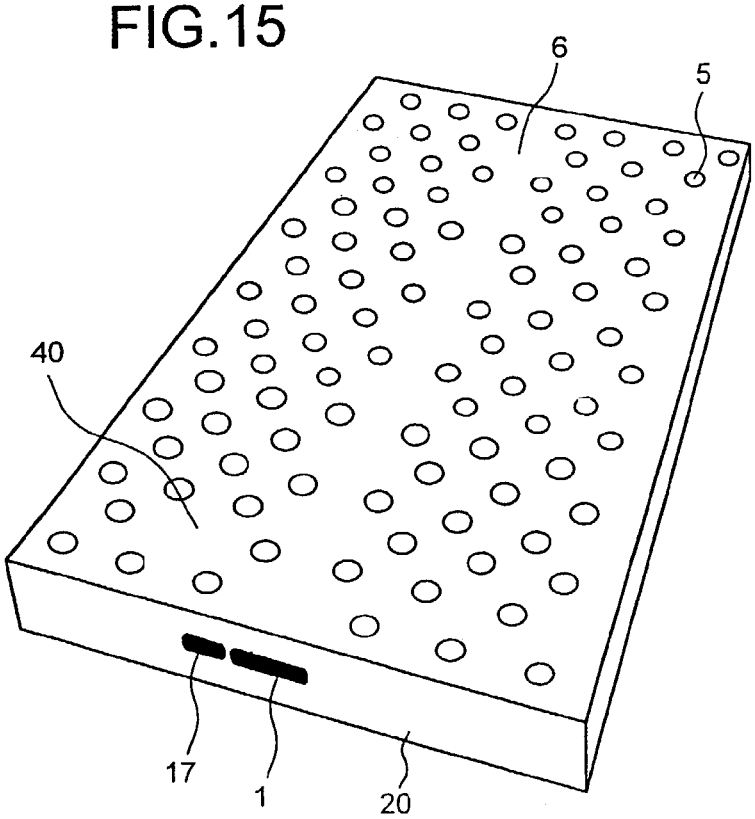
FIG. 15 is a perspective view that schematically shows the configuration of an eighth embodiment of the optical active device according to the present invention.

FIG. 15 is a perspective view that schematically shows the configuration of an eighth embodiment of the optical active device according to the present invention. In FIG. 15, a point (isolated) defect 40 is introduced at one place in the periodic air hole structures 5 in the two-dimensional plane, in FIG. 6 of the second embodiment, and an active layer 17 is further formed below the region between the linear defect region 6 and the point (isolated) defect 40, separately from the active layer 1. Such an optical active device can be produced by the same method as that explained in the second embodiment.

In the optical active device having such a configuration, by changing the excitation state of the active layer 17 by optical excitation or current excitation, the effective refractive index thereof can be changed due to the Kramers-Kroning relations, and hence a wavelength variable laser resonator can be realized.

In the fourth embodiment, it is also possible to monitor leaked light by arranging an optical monitoring unit such as a photo diode (PD) with respect to a point (isolated) defect, which is not used for input or output from/to outside of the device, of a plurality of point (isolated) defects, and to perform feedback of the optical property control, while referring to the monitoring result.

Figure 16:
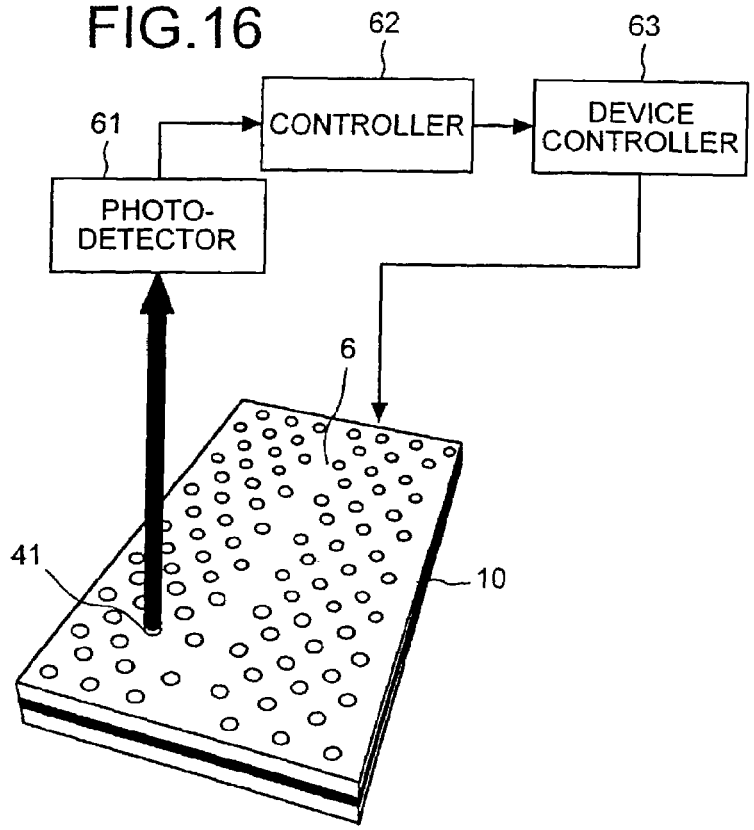
FIG. 16 is a block diagram that shows the configuration of a ninth embodiment of the optical active device according to the present invention.

FIG. 16 is a block diagram that shows the configuration of a ninth embodiment of a semiconductor laser oscillator capable of feedback of the optical property control. This semiconductor laser oscillator has an optical active device 10, a photodetector 61, a controller 62 and a device controller 63. The optical active device 10 has a structure such that there are a linear defect region 6 and one point (isolated) defect 41 in a slab layer having a two-dimensional slab photonic crystal structure. Such a two-dimensional slab photonic crystal forms a compound resonator as shown in FIG. 8 in the third embodiment. The photodetector 61 detects laser beams radiated from the point (isolated) defect 41, and output the value to the controller 62. The controller 62 receives the output value from the photodetector 61, compares the value with a reference value stored beforehand, and output the result to the device controller 63. The device controller 63 is a unit that allows any one of the light, electricity, heat, sound, stress, and physical deformation to act on the optical active device 10.

The operation of this semiconductor laser oscillator is explained. At first, the device controller 63 allows any one of the light, electricity, heat, sound, stress, and physical deformation to act on the point (isolated) defect 41. Thereby, the point (isolated) defect 41 and the linear defect region 6 resonate with respect to a known specific wavelength, by the structure of the optical active device 10. A part of the resonating laser beams is leaking from the point (isolated) defect 41, and this leaking beam is detected by the photodetector 61, and the value is output to the controller 62. The controller 62 compares the size of the received output value and the reference value. When the output value is equal to or larger than a predetermined value, the controller 62 judges that the laser beams are controlled to a specific wavelength in the optical active device 10, and turns off the feedback control of the device controller 63 by the light, electricity, heat, sound, stress, or physical deformation. On the other hand, when the output value is smaller than the predetermined value, the controller 62 judges that the laser beams are not controlled to a specific wavelength in the optical active device 10, and turns on the feedback control of the device controller 63 by the light, electricity, heat, sound, stress, or physical deformation, thereby allows any one of the light, electricity, heat, sound, stress, or physical deformation to act thereon. In this manner, the control of the optical properties can be performed, reflecting the operation of the device.

In FIG. 16, an example in which there is only one point (isolated) defect 41 has been explained. However, it is also possible to introduce a plurality of different point (isolated) defects in the optical active device, and arrange a plurality of pairs of the controller and the device controller with respect to the respective point (isolated) defects. By such a configuration, control corresponding to a plurality of wavelengths becomes possible.

In FIG. 8 that shows the third embodiment, by controlling the refractive index of the linear defect region 6 separately, using the light, electricity, heat, sound, stress, or physical deformation, a wavelength variable laser resonator can be realized, without controlling the point (isolated) defect 31. As shown in FIG. 6, the similar effect can be exhibited by a structure in which the active layer 1 exists only in the linear defect region 6.

As a tenth embodiment, as the means for controlling the refractive index by using light, electricity, heat, sound, stress, or physical deformation, specifically, it is possible to use refractive index fluctuations through the photo refractive effect by light, refractive index fluctuations through the Frantz-Keldysh effect by the electric field, refractive index fluctuations through the Kramers-Kroning effect with a band change due to the quantum Stark effect, refractive index fluctuations through the electro-optical effect due to the electric field, refractive index fluctuations through the acousto-optic effect by acoustic waves, and refractive index fluctuations by adding a stress by a minute pin or the like.

Figure 17:
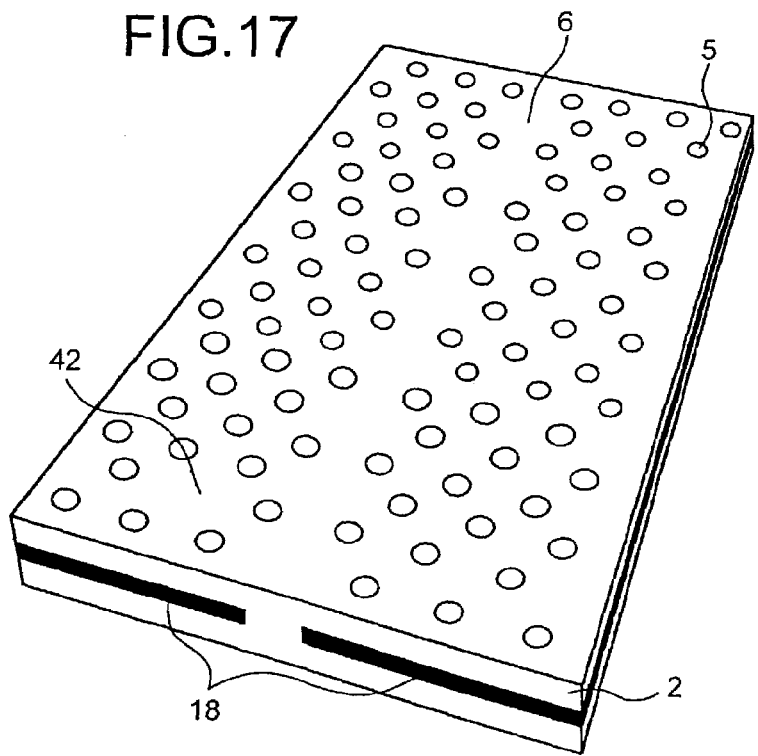
FIG. 17 is a perspective view that schematically shows the configuration of an eleventh embodiment of the optical active device according to the present invention.

FIG. 17 is a perspective view that schematically shows the configuration of an eleventh embodiment of the optical active device according to the present invention. In FIG. 17, an active layer 18 is formed in a portion other than the linear defect region 6, instead of the active layer 1 formed on the whole plane, in FIG. 1 of the first embodiment, to introduce a point (isolated) defect 42 in the two-dimensional refractive index periodic structure. By controlling this independent active layer 18, using the light, electricity, heat, sound, stress, or physical deformation, a wavelength variable laser resonator can be realized without controlling the point (isolated) defect. In this case, even when the active layer 18 may cover or may not cover the region where the point (isolated) defect 42 exists, the same effect can be exhibited by design optimization.

Figure 18:
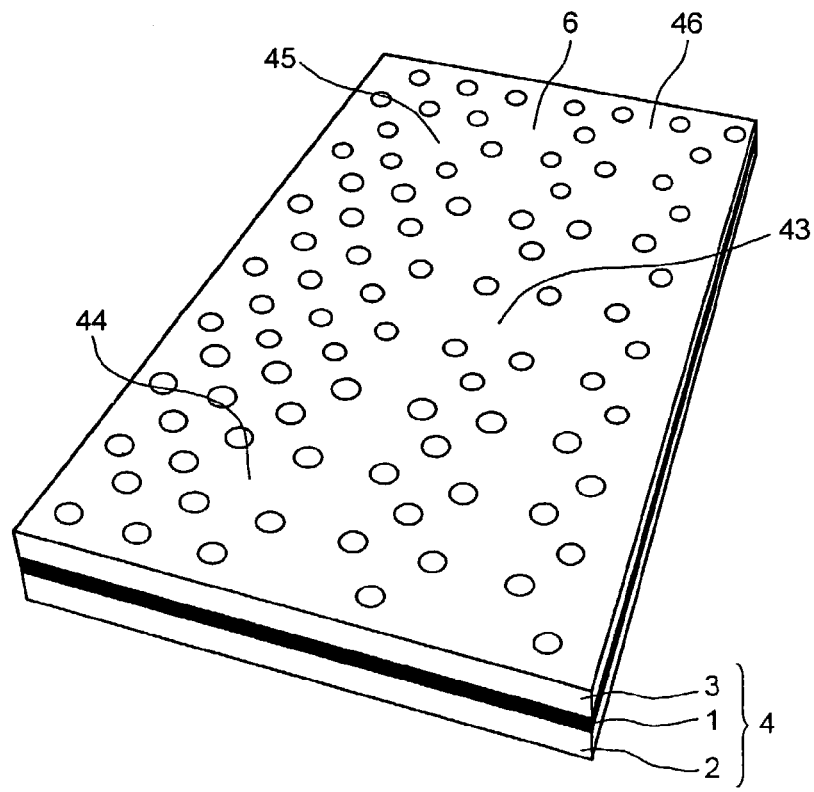
FIG. 18 is a perspective view that schematically shows the configuration of a twelfth embodiment of the optical active device according to the present invention.

FIG. 18 is a perspective view that schematically shows the configuration of a twelfth embodiment of the optical active device according to the present invention. In FIG. 18, a second linear defect region 46, a point (isolated) defect 43 interacting with the two linear defect regions 6 and 46, and point (isolated) defects 44 and 45 interacting with the linear defect region 6 are introduced in the periodic air hole structures 5 in the two-dimensional plane, in FIG. 1 of the first embodiment. The same constituents as those of the third embodiment are denoted by the same reference symbols, and the explanation thereof is omitted.

By the point (isolated) defects 44 and 45, the linear defect region 6 becomes a master oscillator, in which the resonance frequency is fixed, and the linear defect region 6 can be also a MOPA (Master Oscillator Power Amplifier) device by the point (isolated) defect 43, which is a power amplifier for introducing the light to the second linear defect region 46 and amplifying the light. As shown in FIG. 3, the control thereof becomes possible by controlling the refractive index, using the light, electricity, heat, sound, stress, or physical deformation.

Figure 19:
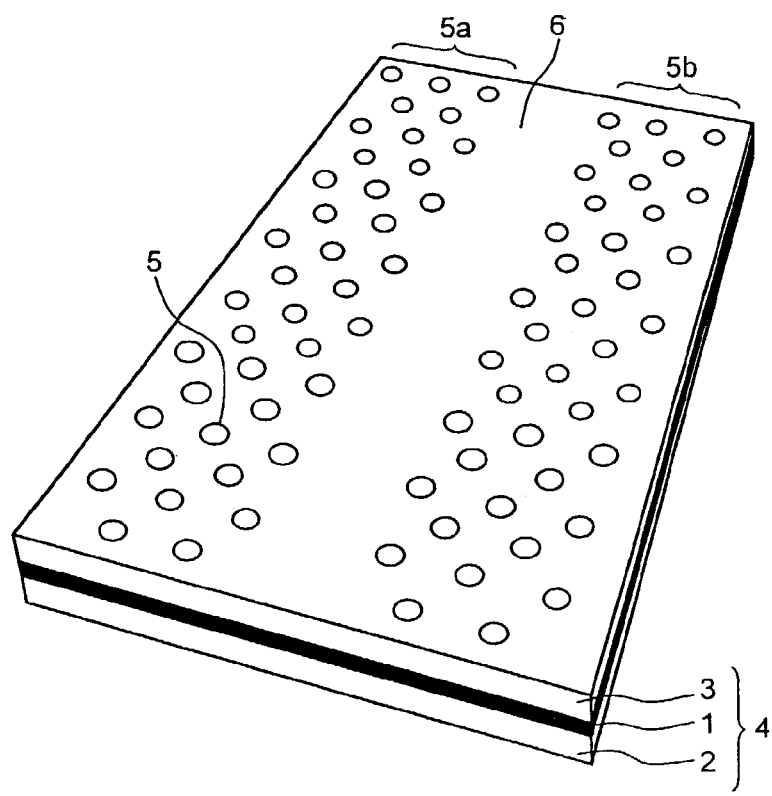
FIG. 19 is a perspective view that schematically shows the configuration of a thirteenth embodiment of the optical active device according to the present invention.

FIG. 19 is a perspective view that schematically shows the configuration of a thirteenth embodiment of the optical active device according to the present invention. In FIG. 19, the whole of the periodic air hole structures 5a existing on one side of the linear defect region 6, in FIG. 1, is parallel-displaced within the range of about several score times of the lattice period "a", in a direction orthogonal to the major axis of the linear defect region 6 in the slab layer 4, to thereby change the space between the air hole structure 5a and the air hole structure 5b, that is, the width of the linear defect region 6.

In the optical active device 10 having such a structure, since the refractive index periodic structure outside the linear defect region 6 is not changed from that of FIG. 1, the photonic crystal slab mode in the photonic band structural drawing in FIG. 4 is unchanged, and the photonic band gap does not change, as well. However, the waveguide mode including the band end position changes, due to a change of the linear defect region 6, and hence the laser oscillation mode and wavelength can be adjusted and changed to a desired value. Thereby, it becomes possible to allow only one waveguide mode to exist in the photonic band gap, or to increase the waveguide mode so that a plurality of modes exist, or to adjust the active wavelength region in the active layer and the waveguide mode to a desired wavelength correspondence. Different from a band mode of a general DFB laser, the wavelength change and the mode change can be made very large by the waveguide width in this device, since the defect mode is used. For example, in the case of the triangular lattice period having the lattice period "a"=0.42 μm, it has been confirmed that the wavelength can be changed by about 80 nm, from 1.5 μm to 1.58 μm, only by changing the waveguide width by about 0.1a. Such a large displacement cannot be considered in the general DFB laser having the different oscillation principle, and the value thereof is 1/10 or less.

In the first to thirteenth embodiments, an example in which the two-dimensional slab photonic crystal having a triangular lattice-form periodic air hole structures 5 has been explained. However, the structure in the present invention is not limited to the triangular lattice form, and may be a structure that can realize a two-dimensional photonic band gap structure, such as a square lattice structure. Further, in the first to thirteenth embodiments, explanation has been made, using a circular opening as the air hole structure 5 forming the refractive index periodic structure. However, this air hole structure 5 may not be a hollow hole, and an organic material such as polymer, which is a material having a relatively low refractive index, as compared with a semiconductor material constituting the two-dimensional slab photonic crystal, or an inorganic material such as a dielectric may be filled in the air hole structure 5. Further, as the vertical confinement on the two-dimensional plane, it is only necessary to confine the refractive index sufficiently. Therefore, the two-dimensional plane may comprise an organic material such as polymer having a low refractive index, or an inorganic material such as a dielectric, so that a difference in refractive index becomes relatively large, as in the air hole structure 5.

In the first to thirteenth embodiments, a laser oscillator has been explained as an example of the optical active device. However, as the optical active device other than the laser oscillator, it may be a device that operates as an optical switch, such that the point (isolated) defect or the linear defect region, or an intermediate region between the both defects is controlled, using the light, electricity, heat, sound, stress, or physical deformation, and when the both defects are connected, it is made ON, and when the both defects are not connected, it is made OFF.

In a linear defect waveguide having a linear defect region combining one or more point (isolated) defects, an active dispersion compensator that can retard or accelerate the propagation of a specific wavelength in the waveguide, by turning ON/OFF the connected state of the light propagating through the waveguide and the point (isolated) defect by the similar method, can be formed.

The optical active device of the present invention can be also used as a semiconductor optical amplifier (SOA) or a modulator, by inputting or outputting the external light, as in the normal compound semiconductor device.

As explained above, according to this invention, since an active layer is introduced in a two-dimensional slab photonic crystal forming a linear defect region, there is the effect that an optical active device such as a laser and a modulator can be realized. Further, since the active layer and the waveguide can be integrally formed, there is the effect that the apparatus configuration for performing optical communication and optical information processing can be made further small.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical active device comprising
    a slab photonic crystal structure including a slab layer having a two-dimensional expanse and comprising:
        an active layer, and
        first and second cladding layers sandwiching the active layer, wherein the slab layer has
            a plurality of air holes extending through the slab layer so that air contacts opposite surfaces of the slab layer, the active layer in the air holes, and surrounds the active layer and the first and second cladding layers, wherein the air holes are arranged periodically in the slab layer and produce a periodic refractive-index distribution structure in a two-dimensional plane, and
            a waveguide including a first linear defect region in the periodic refractive-index distribution structure.

2. The optical active device according to claim 1, wherein one end, in a longitudinal direction, of the first linear defect region is terminated by the periodic refractive-index distribution structure within a plane including the slab layer.

3. The optical active device according to claim 1, wherein both ends, in a longitudinal direction, of the first linear defect region are terminated by the periodic refractive-index distribution structure within a plane including the slab layer.

4. The optical active device according to claim 1, wherein the active layer is present only where the first linear defect region is present.

5. The optical active device according to claim 1, wherein the periodic refractive-index distribution structure includes one of a point defect and an isolated defect.

6. The optical active device according to claim 5, including a plurality of one of the point defect and the isolated defect.

7. The optical active device according to claim 5, further comprising a control unit for controlling the refractive index of the one of the point defect and the isolated defect, independently of the first linear defect region.

8. The optical active device according to claim 5, further comprising a control unit for controlling the refractive index in a region near the one of the point defect and the isolated defect.

9. The optical active device according to claim 1, including a second linear defect region in the periodic refractive-index distribution structure.

10. The optical active device according to claim 1, including a second linear defect region in the periodic refractive-index distribution structure, and a control unit for controlling the refractive index of the second linear defect region, independently of the first linear defect region.

11. The optical active device according to claim 5, wherein the active layer is present only where the first linear defect region and the one of the point defect and the isolated defect are present, and including a control unit for controlling the refractive index of the one of the point defect and the isolated defect, independently of the first linear defect region.

12. The optical active device according to claim 5, further comprising a control unit for controlling the refractive index of a region between the first linear defect region and the one of the point defect and the isolated defect.

13. The optical active device according to claim 5, wherein the active layer is present only where the first linear defect region is present, and between the first linear defect region and the one of the point defect and the isolated defect.

14. The optical active device according to claim 5, further comprising:
    an optical monitoring unit that monitors light emitted from the one of the point defect and the isolated defect; and
    an optical property control unit for controlling optical properties of the optical active device, based on the light monitored.

15. The optical active device according to claim 1, further comprising a control unit for controlling the refractive index of the first linear defect region.

16. The optical active device according to claim 1, wherein the active layer is present in a portion excluding the portion where the first linear defect region is present.

17. The optical active device according to claim 1, including a second linear defect region extending substantially parallel to the first linear defect region, one of two first point defects and two isolated defects interacting with the second linear defect region, and one of a second point defect and a second isolated defect interacting with the first and second linear defect regions in the periodic refractive-index distribution structure, wherein
    the second linear defect region is a master oscillator having a resonance frequency fixed by the one of the first point defects and the first isolated defects; and
    the first linear defect region is a slave power amplifier which amplifies light produced by the master oscillator and introduced from the one of the second point defect and the second isolated defect.

18. The optical active device according to claim 1, wherein the first linear defect region displaces one of the periodic refractive-index distribution structures in a direction perpendicular to the first linear defect region in a plane of the slab layer, changing width of the first linear defect region.

19. The optical active device according to claim 1, wherein the active layer and the first and second cladding layers comprise crystalline semiconductor materials.

20. The optical active device according to claim 19, wherein the active layer includes a material selected from the group consisting of InGaAsP, GaAs, GaP, GaInP, AlGaInP, GaAsP, and GaN, and the first and second cladding layers include a material selected from the group consisting of GaAs, AlGaAs, AlGaInP, InGaAsP, InP, and GaN.

* * * * *